United States Patent
Rao et al.

(10) Patent No.: US 9,033,092 B1
(45) Date of Patent: May 19, 2015

(54) VEHICLE FRONT END STRUCTURE PROVIDING PEDESTRIAN PROTECTION

(71) Applicant: Ford Global Technologies, LLC, Dearborn, MI (US)

(72) Inventors: Manoharprasad K. Rao, Novi, MI (US); Jialiang Le, Canton, MI (US); Iskander Farooq, Novi, MI (US); Levasseur Tellis, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/086,347

(22) Filed: Nov. 21, 2013

(51) Int. Cl.
*B60R 21/38* (2011.01)
*B60R 21/34* (2011.01)
*B60R 21/00* (2006.01)

(52) U.S. Cl.
CPC ........... *B60R 21/38* (2013.01); *B60R 2021/343* (2013.01); *B60R 2021/0004* (2013.01); *B60R 2021/0048* (2013.01)

(58) Field of Classification Search
USPC .................... 180/274; 296/193.11, 187.04
IPC ........................................................ B60R 21/38
See application file for complete search history.

(56) References Cited

U.S. PATENT DOCUMENTS

| | | | |
|---|---|---|---|
| 6,439,330 B1 * | 8/2002 | Paye | 180/69.21 |
| 6,499,555 B2 * | 12/2002 | Ishizaki et al. | 180/274 |
| 6,523,912 B1 | 2/2003 | Bond, III et al. | |
| 6,571,901 B2 * | 6/2003 | Lee | 180/274 |
| 7,073,846 B2 * | 7/2006 | Borg et al. | 296/187.13 |
| 7,195,090 B2 | 3/2007 | Parks et al. | |
| 7,232,178 B2 * | 6/2007 | Neal et al. | 296/187.04 |
| 7,506,716 B1 * | 3/2009 | Salmon et al. | 180/274 |
| 7,559,399 B2 * | 7/2009 | Lewis et al. | 180/274 |
| 7,637,344 B2 * | 12/2009 | Park | 180/274 |
| 7,815,007 B2 * | 10/2010 | Mori et al. | 180/274 |
| 7,845,691 B2 * | 12/2010 | Sundararajan et al. | 292/216 |
| 7,931,111 B2 * | 4/2011 | Kim et al. | 180/274 |
| 8,424,629 B2 * | 4/2013 | Ralston et al. | 180/274 |
| 8,534,410 B2 * | 9/2013 | Nakaura et al. | 180/274 |
| 8,573,658 B2 * | 11/2013 | Kim | 292/201 |
| 8,751,113 B2 * | 6/2014 | Foo et al. | 701/47 |
| 2007/0125589 A1 * | 6/2007 | Murphy | 180/274 |

FOREIGN PATENT DOCUMENTS

EP        1839961 A1        10/2007

* cited by examiner

*Primary Examiner* — Faye M Fleming
(74) *Attorney, Agent, or Firm* — Frank A. MacKenzie; Brooks Kushman P.C.

(57) ABSTRACT

An exemplary vehicle front end structure may include an energy absorbing structure movable between deployed and non-deployed positions. The structure may further include an actuator system that moves the energy absorbing structure from the deployed position to the non-deployed position. The energy absorbing structure in the deployed position may be spaced apart from an engine support structure by a first distance that is greater than a second distance by which the energy absorbing structure in the non-deployed structure is spaced apart from the engine support structure.

16 Claims, 7 Drawing Sheets

VEHICLE FRONT END STRUCTURE PROVIDING PEDESTRIAN PROTECTION

BACKGROUND

Automotive manufacturers continuously investigate vehicle front end structures that mitigate injuries associated with pedestrian collisions. The vehicle front end structure can have multiple impact areas, including the hood, the grille, the headlamps, the fender, the windshield and the cowl. One exemplary collision may include the lower limbs of the pedestrian first contacting the vehicle bumper, the upper thigh or pelvis hitting the leading edge of the hood, and the head and upper torso impacting the top surface of the hood or the windshield. The hood is typically made of sheet metal, which is a somewhat deformable energy absorbing structure. On the other hand, components underlying the hood in the engine bay and the engine bay support structure itself typically are stiffer and therefore do not absorb much of the energy associated with pedestrian collisions. In this respect, a sufficient gap or clearance between the hood and the engine components can allow the hood to deform and provide a controlled deceleration of the pedestrian's head thus significantly mitigating potential injuries associated with any head impact on the hood.

Multiple challenges may be associated with incorporating a sufficient gap or clearance between the hood and engine components. For instance, the gap or clearance may require a spatial arrangement of the hood and engine components, which can adversely affect aerodynamics and styling requirements for a particular vehicle. In addition, some regions of the hood may be directly supported by stiff support structures without any clearance for deformation of those regions of the hood. Some examples of these regions can include the edges of the hood and the cowl where the hood meets the windshield.

Vehicle front end structures may include modules that use pyrotechnic devices to deploy multiple energy absorbing structures, such as airbags. While these pyrotechnic devices may quickly deploy energy absorbing structures, the devices may be non-repeatable and therefore need to be replaced if they are deployed in response to the false prediction of collisions with pedestrians by the vehicle based pre-crash sensing systems or due to lower speed impacts with non-pedestrian objects thus increasing the cost of such devices.

It would therefore be desirable to provide a vehicle front end structure that can improve pedestrian protection by providing additional clearance from stiff vehicle structures, may be reused if no pedestrian is actually impacted by the vehicle and does not adversely affect aerodynamic performance and styling requirements associated with the vehicle.

SUMMARY

An exemplary vehicle front end structure may include an energy absorbing structure that is movable between deployed and non-deployed positions. The structure may further include an actuator system that moves the energy absorbing structure from the deployed position to the non-deployed position. The energy absorbing structure in the deployed position may be spaced apart from an engine support structure by a first distance that is greater than a second distance by which the energy absorbing structure in the non-deployed structure is spaced apart from the engine support structure.

An exemplary pedestrian protection system for a vehicle may have a controller, which generates a deactivation signal. The system may further include an energy absorbing structure and an actuator system that moves the energy absorbing structure from the deployed position to the non-deployed position in response to the deactivation signal. The energy absorbing structure in the deployed position may be spaced apart from an engine support structure by a first distance that is greater than a second distance by which the energy support structure in the non-deployed structure is spaced apart from the engine support structure.

An exemplary method of operating a pedestrian protection system may include moving an energy absorbing structure from a non-deployed position to a deployed position. The energy absorbing structure in the deployed position is spaced apart from an engine support structure by a first distance. The method may further include generating a deactivation signal, and returning the energy absorbing structure to the non-deployed position in response to the deactivation signal. The energy absorbing structure in the non-deployed position may be spaced apart from the engine support structure by a second distance, which is less than the first distance.

DETAILED DESCRIPTION

Referring now to the discussion that follows and also to the drawings, illustrative approaches are shown in detail. Although the drawings represent some possible approaches, the drawings are schematic in nature and thus not drawn to scale, with certain features exaggerated or removed to better illustrate and explain the present disclosure. Further, the descriptions set forth herein are not intended to be exhaustive or otherwise limit or restrict the claims to the precise forms and configurations shown in the drawings and disclosed in the following detailed description.

Figure 1:
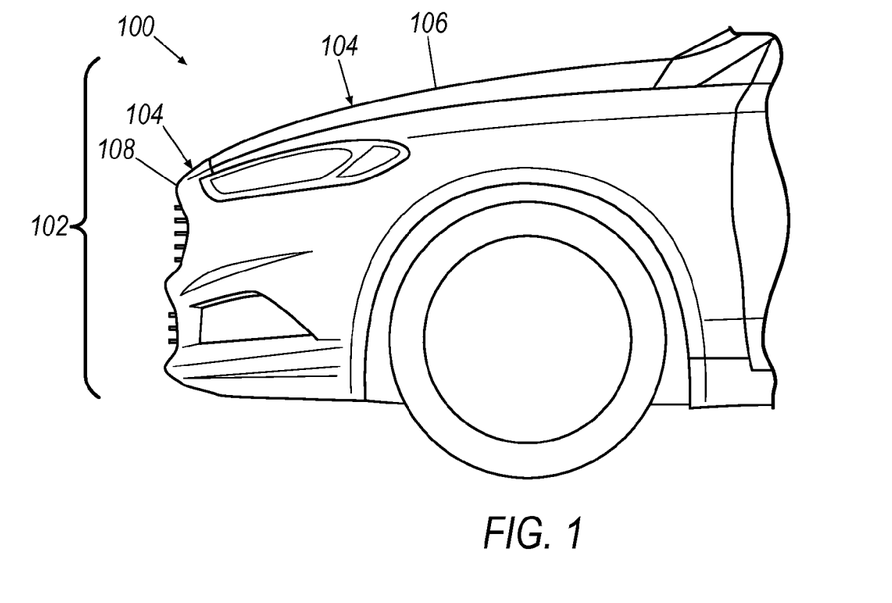
FIG. 1 is an enlarged side view of an exemplary pedestrian protection system having a vehicle front end structure with a hood and an upper fascia grille in non-deployed positions.
Figure 2:
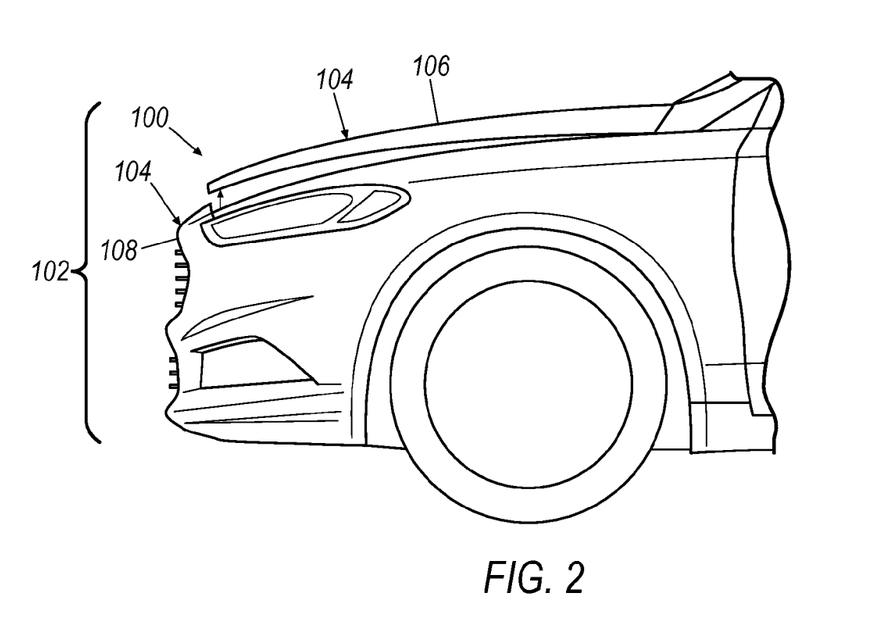
FIG. 2 is an enlarged side view of the exemplary pedestrian protection system of FIG. 1, showing the hood in a deployed position and the upper fascia grille in the non-deployed position.
Figure 3:
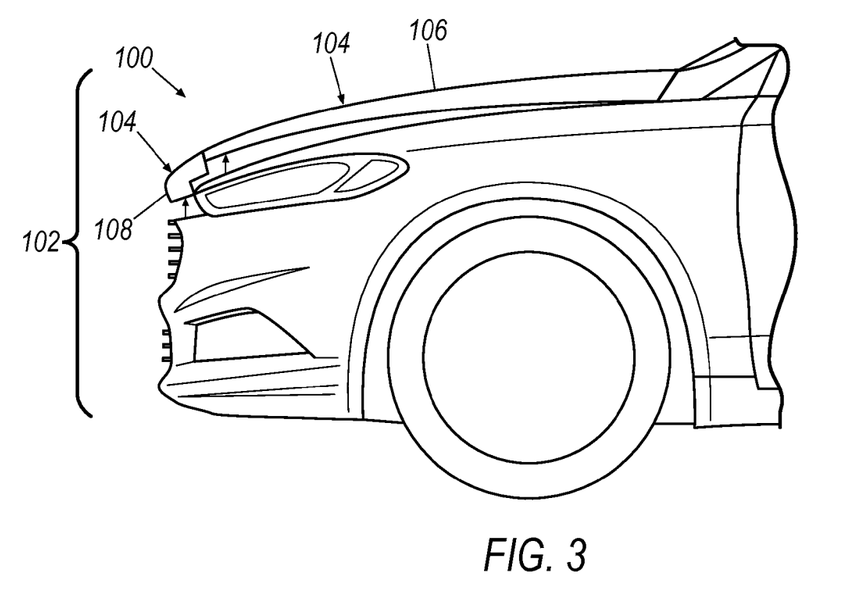
FIG. 3 is an enlarged side view of the exemplary pedestrian protection system of FIG. 1, showing the hood and upper fascia grille in deployed positions.

FIGS. 1-3 generally illustrate an exemplary pedestrian protection system 100 including a vehicle front end structure 102 that has one or more energy absorbing structures 104 ("energy absorbers") movable between deployed and non-deployed positions. In this example, the energy absorbers 104 may include a hood 106, an upper fascia grille 108, or other suitable structures having an impact area that may directly or indirectly contact a pedestrian.

Figure 4:
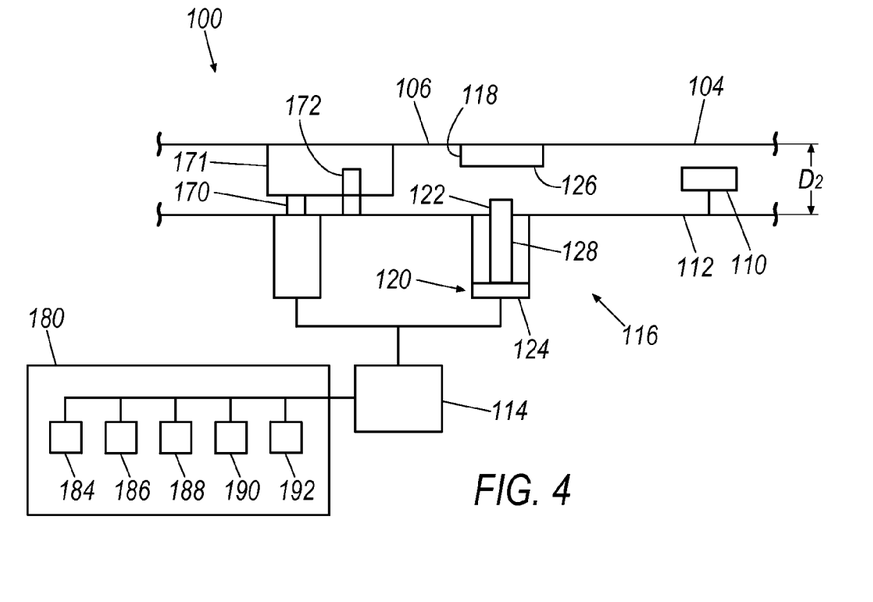
FIG. 4 is a schematic view of the exemplary pedestrian protection system of FIG. 1, including a primary latch holding a crash absorber in the non-deployed position.

As shown in FIG. 4, a primary latch 170 may extend from the engine support structure 112 and may be fastened to a striker 171 that extends from the energy absorber 104 so as to hold the energy absorber 104 in the non-deployed position. The primary latch 170 may release the striker 171, such that a biasing member 110 moves the energy absorber 104 from the non-deployed position (FIG. 4) to the deployed position (FIG. 5), and a secondary latch 172 may attach to the striker 171 and hold the energy absorber 104 in the deployed position. One non-limiting example of the biasing member can be a spring disposed in the hood latch itself. The energy absorber 104 in the deployed position may be spaced apart from an underlying engine support structure 112 by a first distance D1, which is greater than a second distance D2 by which the energy absorber 104 in the non-deployed position is spaced apart from the same engine support structure 112. As one example, the energy absorber 104 in its deployed position may be the hood 106 spaced apart from the underlying engine support structure 112 by a distance, which is greater than the distance that the hood 106 in its non-deployed position is spaced apart from the same structure 112. In this respect, for example, a pedestrian's head or upper body may impact the hood 106 and deform the hood 106 over a greater distance before contacting the engine support structure 112, thus improving the controlled deceleration of the pedestrian's body and absorbing more collision energy as compared to the hood 106 in the non-deployed position. Similarly, the energy absorber 104 in its deployed position may be the grille 108 spaced apart from the underlying engine support structure 112 by a distance, which is greater than a distance by which the grille 108 in its non-deployed position is spaced apart from the engine support structure 112. In this way, a pedestrian's legs or pelvis may impact the grille 108 and deform the grille 108 over a greater distance before contacting the underlying engine support structure 112, e.g. radiator, thus also improving the controlled deceleration of the pedestrian's body and absorbing more collision energy as compared to the grille 108 in the non-deployed position. Furthermore, if no collision actually occurs with the energy absorbers 104, the energy absorbers 104 may be returned to their respective non-deployed positions (FIG. 1) and reused in a future potential collision thereby providing a substantially cost-effective countermeasure. Moreover, the energy absorbers 104 in the non-deployed position can facilitate styling requirements and aerodynamic properties of the vehicle.

Figure 5:
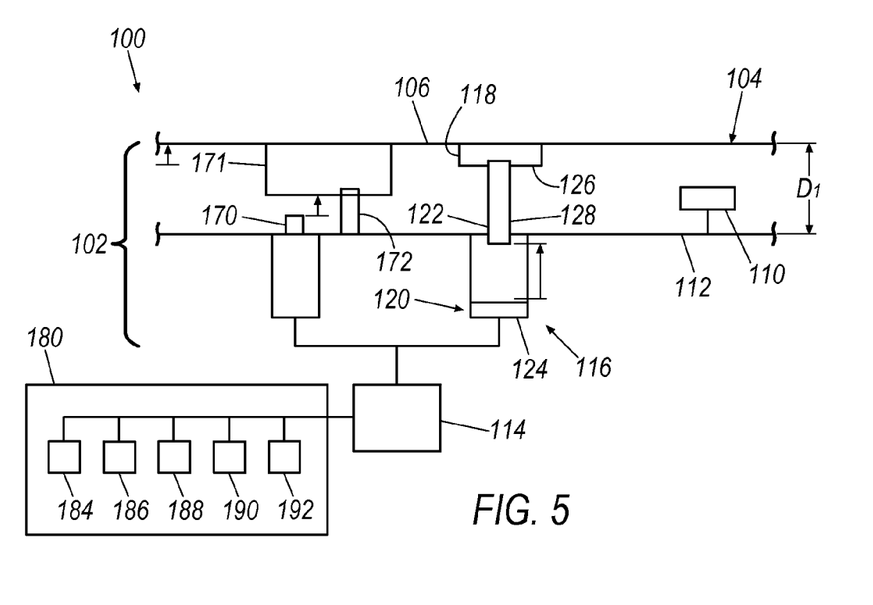
FIG. 5 is a schematic view of the exemplary pedestrian protection system of FIG. 2, including a secondary latch holding the energy absorber in the deployed position and an actuator system having first and second supplemental fasteners engaged to one another, prior to returning the energy absorber to the non-deployed position.

Referring again to FIGS. 4 and 5, the system 100 may have a controller 114 and an actuator system 116 that returns the energy absorber 104 from the deployed position (FIG. 5) to the non-deployed position (FIG. 4). The actuator system 116 may include a first supplemental fastener 118 attached to the energy absorber 104. The actuator system 116 may further include a latch device 120 that has a second supplemental fastener 122 and a motor 124, which moves the second supplemental fastener 122 to an extended position to engage the first supplemental fastener 118 when the energy absorber 104 is disposed in the deployed position (FIG. 5). The motor 124 further moves the second supplemental fastener 122 to a refracted position to move the energy absorber 104 to the non-deployed position. In this example, the first supplemental fastener 118 may be a striker 126 attached to a hood 106, and the second supplemental fastener 122 may be an arm 128, which is moved by the motor 124 to engage the striker 126 and return the hood 106 to the non-deployed position. However, the first and second supplemental fasteners can be any suitable fasteners used to move the hood 106 or other energy absorbers 104

Figure 6:
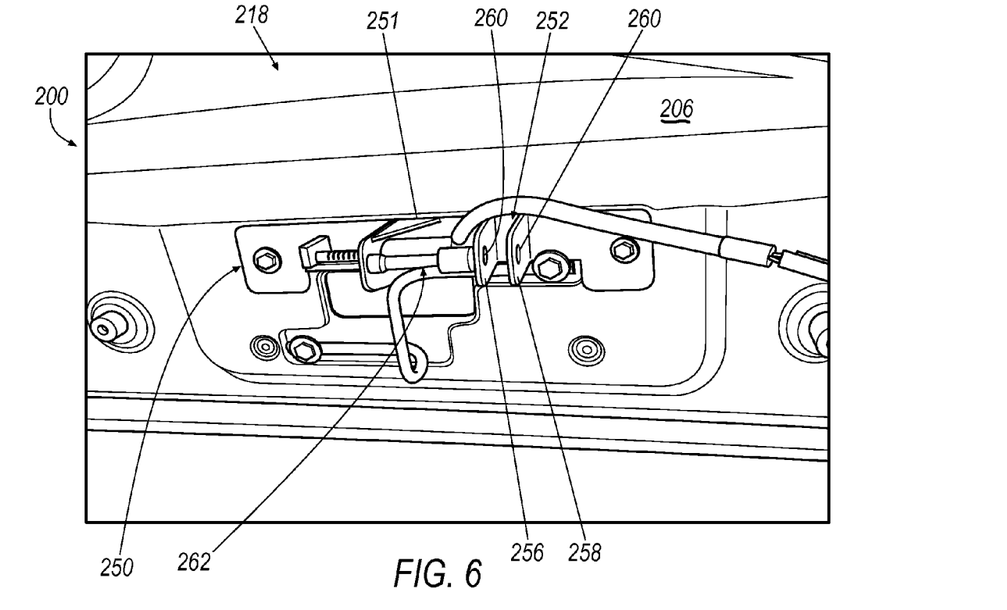
FIG. 6 is a bottom perspective view of another exemplary first supplemental fastener of the actuator system of FIG. 4.
Figure 7:
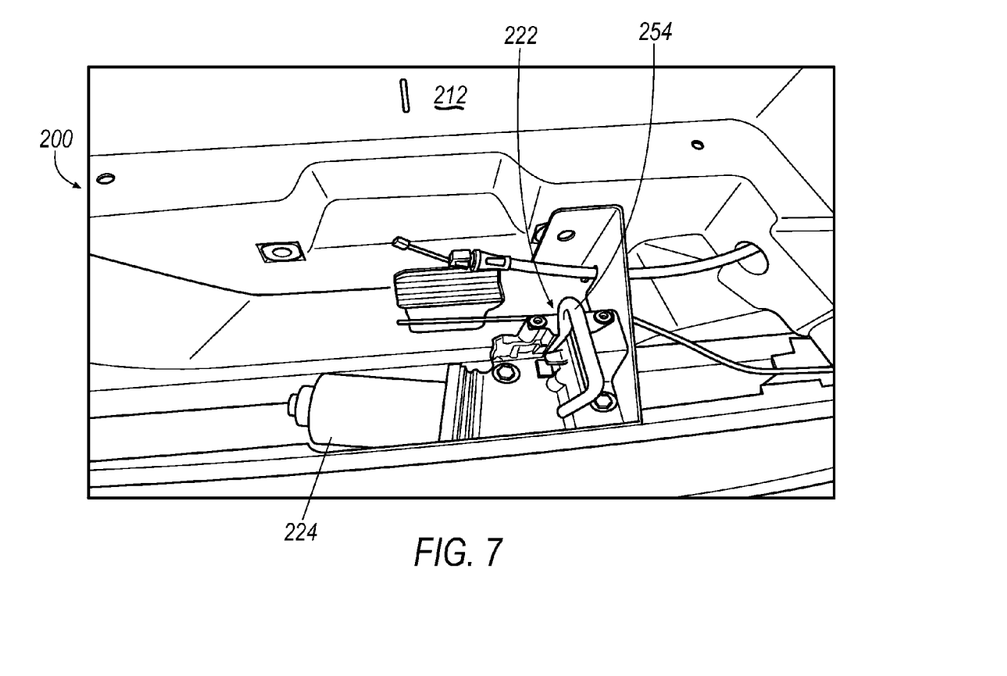
FIG. 7 is a top perspective view of another exemplary second supplemental fastener of the actuator system of FIG. 5.

Referring to FIGS. 6 and 7, another exemplary pedestrian protection system 200 is similar to the system 100 of FIGS. 1-3, and has corresponding components identified by similar reference numerals in the 200 series. However, the system 200 has a first supplemental fastener 218, (FIG. 6) which may be a pin assembly 250 (FIG. 6) attached to the hood 206. The pin assembly 250 may include a bracket 252, which is attached to the hood 206 and configured to receive the second supplemental fastener 222 (FIG. 7), e.g. a striker 254. The bracket 252 may be a U-shaped bracket with a pair of opposing tabs 256, 258 having respective holes 260. Moreover, the assembly 250 may further include a pin 262 and a solenoid 251 or other suitable actuator that moves the pin 262 through the holes 260 to hold the striker 254 (FIG. 7) within the bracket 252 and fasten the first and second supplemental fasteners to one another. In addition, the striker 254 may be slidably carried by the engine support structure 212 to engage the pin assembly 250 and move the hood 206 to the non-deployed position. The second supplemental fastener 222 may further include a motor 224 that moves the striker 254 to an extended position so that the pin assembly 250 may be fastened to the striker 254. The motor 224 may then move the hood 206 to a retracted position. After the hood 206 moves to the retracted (non-deployed) position (FIG. 4) and the controller 114 confirms that the hood 206 is in the closed position via a sensing system, e.g., a position sensor located near the primary latch 170, the controller 114 sends a signal to the solenoid 251 to retract the pin 262. The pin assembly 250 then disengages from the striker 254 (FIG. 6). The hood 206 can now be opened or closed in usual fashion when access to the engine compartment is desired by a driver or a service technician. However, rather the pin assembly 250 and the striker 254, the system may include combinations of any other suitable first and second supplemental fasteners 200 that can disengage from one another.

Figure 8:
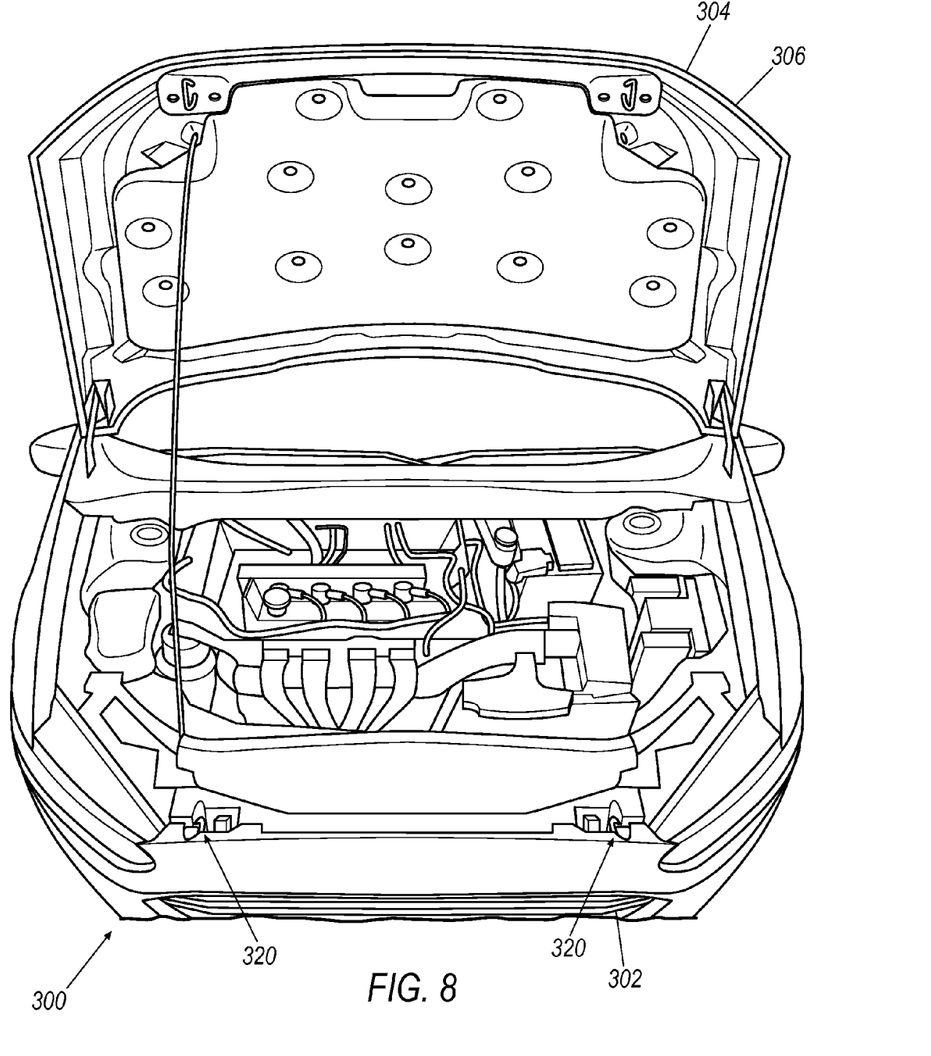
FIG. 8 is a front perspective view of another exemplary vehicle front end structure.

Referring to FIG. 8, still another exemplary pedestrian protection system 300 is similar to the system 100 of FIGS. 1-3. However, this system 300 does not include the energy absorber 104 of FIGS. 1-3, which moves from the non-deployed position to the deployed position by releasing a primary latch 170 and then using a secondary latch 172 to hold the energy absorber 104 in a deployed position. Rather, the system 300 includes a pair of latch devices 320, which are slidably attached to opposing sides of the front end structure 302 and remain attached to the energy absorber 304, e.g. hood 306. In this respect, the latch devices 320 move the hood 306 between the non-deployed position and the deployed position, instead of moving the hood 306 to only the non-deployed position.

Figure 9:
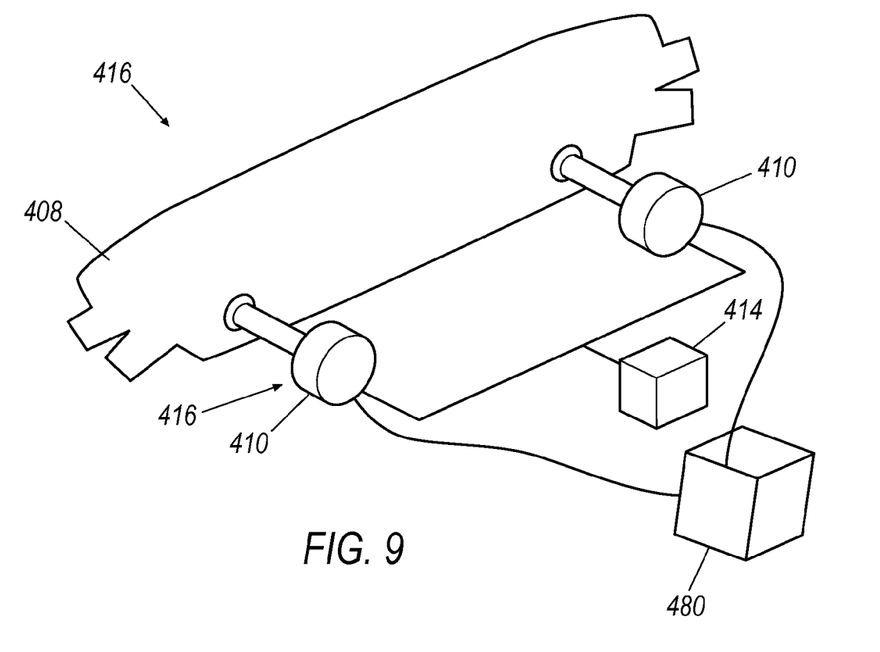
FIG. 9 is a perspective view of an actuator system for the upper fascia grille of FIG. 1.

FIG. 9 illustrates an exemplary actuator system 416 used for moving an upper fascia grille 408 between the non-deployed and deployed positions. This actuator system 416 can include one or more screw-type linear actuators 410 that move the grille 408 based on signals generated by the controller 414 or the pre-crash module 480. However, other actuators may be used for moving the grille 408 or other energy absorbers.

Referring back to FIG. 4, the system 100 may include a controller 114 that generates activation and deactivation signals based on various conditions. The activation signal may be generated based on input from one or more sensors and the deactivation signal may be generated by the mere elapse of time, e.g. 2 to 3 minutes, from when the energy absorber 104 is moved to the deployed position, thus permitting integration of the pedestrian protection system 100 into various active and passive vehicle safety systems. The controller 114 may be a component of any suitable pre-crash sensing system, which may include radar devices, lidar devices, cameras or various pre-crash sensing modules that generate the activation signal in response to detecting a potential collision. However, the controller may instead be a stand-alone component that operates independently of any pre-crash module.

The controller 114 may be a computing device that generally includes computer-executable instructions, where the instructions may be executable by one or more computing devices. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

Figure 10:
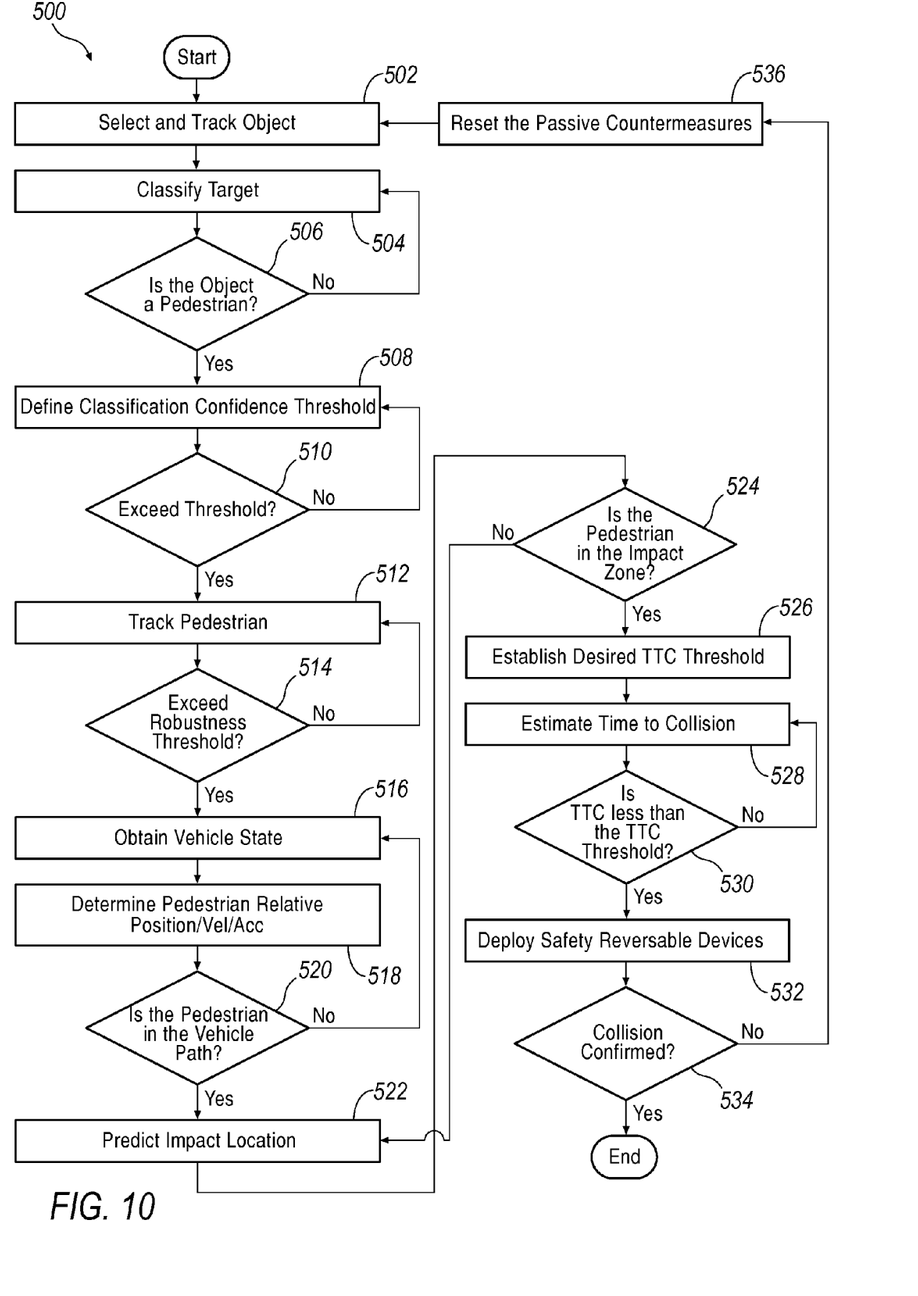
FIG. 10 is a flow chart of method of operating the system of FIG. 1.

FIG. 10 illustrates one exemplary method 500 of operating the pedestrian protection system 100 of FIGS. 1-5 in conjunction with a pre-crash sensing module 180 and moving the energy absorber 104 from its non-deployed position to its deployed position in response to classifying a detected objected as being in the class of a pedestrian. However, the system 100 may be used with various pre-crash sensing modules or operate independently of any pre-crash sensing module by, for example, deploying and retracting the energy absorber 104 based on vehicle speed and other conditions in the vehicle surroundings.

At step 502, the pre-crash sensing module (PSM) 180 detects and tracks objects in the vehicle surroundings using known object detection and object tracking techniques in automotive driver assistance and active safety applications, such as adaptive cruise control, forward collision warning, lane departure warning, lane keep aid and pre-crash sensing based brake assist systems. For instance, the pre-crash sensing module 180 (FIG. 4) may include one or more radar devices 184, lidar devices 186, stereoscopic cameras 188, ultra sound sensors 190, time of flight cameras 192 and other suitable sensors for surround sensing and may use sensor fusion techniques to robustly detect and track objects in real time.

At step 504, the PSM 180 classifies the detected objects in various classes of objects such as large stationary objects, stationary and moving vehicles, and pedestrians.

At step 506, the PSM 180 may determine whether the object is a pedestrian. For instance, the PSM 180 may use the data collected from the sensors and pattern recognition algorithms or a reference lookup table on a computer readable storage medium or other suitable means to determine whether the object is a pedestrian. If the PSM 180 determines that the object is not a pedestrian, the method returns to step 504. Conversely, if the PSM 180 determines that the object is a pedestrian, the method continues to step 508.

At step 508, the PSM 180 may determine a level of confidence or accuracy in classifying the object as a pedestrian.

At step 510, the PSM 180 may determine whether the confidence level exceeds a confidence level threshold. If it does not, the method returns to step 508. If, however, the confidence level does exceed the threshold, then the method proceeds to step 512.

At step 512, the PSM 180 may continue to track the pedestrians. One example may be the PSM 180 tracking the same object over multiple samplings of data. By way of another example, the PSM 180 may track the location of the pedestrian with respect to the current location of the vehicle and the heading of the vehicle. However, this step may be accomplished using other methods.

At step 514, the PSM 180 may determine whether the confidence calculations for detecting and tracking the pedestrians exceed the preselected robustness thresholds for pedestrian detection and tracking.

At step 516, the controller 114 may determine the host vehicle dynamic state from various sensors (not shown) such as wheel speed sensors, accelerometers, inertial measurement unit, Global Position System (GPS) and other vehicle sensors.

At step 518, the controller 114 determines the relative position, velocity and acceleration of the pedestrian with respect to the vehicle from the known dynamic state of the vehicle and the pedestrian tracking information.

At step 520, the controller 114 may determine whether a tracked pedestrian is in the path of the vehicle. If the tracked pedestrian is not within the vehicle path, the method returns to step 516. However, if the tracked pedestrian is within the vehicle path, the method proceeds to step 522.

At step 522, the controller 114 determines the location on the vehicle where the pedestrian is estimated to collide with the vehicle.

At step 524, the controller 114 may determine if the predicted impact location is within a pre-selected impact protection zone for energy absorber 104 activation. For example, the pre-selected impact protection zone for energy absorber 104 activation may cover the entire front end of the vehicle or it may cover only selected part of the vehicle frontal end. If the predicted impact location is outside the pre-selected impact protection zone, the method returns to block 522. If the predicted impact location is within the pre-selected impact zone, the method may continue to step 526.

At step 526, the controller 114 may determine a desired time to contact (TTC) threshold based on the activation time requirements of the resettable energy absorbers 104 and controller 114 calculation update rate. A TTC threshold is a time by which a controller 114 must determine whether to activate an energy absorber 104 for the intended functioning of the energy absorber 104. For example, if the energy absorbers need 400 ms to be fully deployed and controller calculation update rate is 50 ms, the deployment decision has to be made by a TTC threshold that is 450 ms or less before impact between the vehicle and the pedestrian.

At step 528, the controller 114 may estimate a time to collision based on the various data collected by the sensors and the host vehicle dynamic state obtained in block 516. At step 530, the controller 114 may determine whether the estimated time to collision is less than a predetermined threshold. As noted above the time to collision threshold may be selected based on the performance properties of the biasing member 110 to deploy the energy absorber 104 and the controller calculation update rate. It may be advantageous to delay the deployment decision as late as possible to enhance the prediction robustness and accuracy. The method proceeds to block 532 when the predicted time to collision is equal to or less than the TTC threshold.

At step 532, one or more energy absorbers 104 are moved to the deployed position. For instance, the step may be accomplished by the controller 114 generating an activation signal in response to detecting the potential collision. The controller 114 may release the primary latch 170 from a striker 171 that had been used to hold the energy absorber 104 in the non-deployed position (FIG. 4), and the biasing member 110 can move the energy absorber 104 to the deployed position (FIG. 5). The actuator system 116 may move the energy absorber 104 from the non-deployed position in which the energy absorber 104 is spaced apart from the engine body structure 112 by a distance D2, to the deployed position, in which the energy absorber 104 is spaced apart from the engine body structure 112 by a distance D1 which is greater than the distance D2. In this respect, the energy absorber 104 in the deployed position can have additional deformation before contact with the underlying engine support structure 112 to provide controlled deceleration of the pedestrian.

At step 534, the system 100 determines whether a collision actually occurred. This step may be accomplished by one or more suitable contact sensors generating signals indicative of an actual pedestrian collision. If the system 100 determines that no collision occurred, the controller determines that a false positive crash was detected and the method proceeds to step 536. On the other end, if the system 100 confirms that a collision has occurred, the method may terminate.

At step 536, the energy absorber 104 is moved from the deployed position to the non-deployed position. For example, the controller 114 may generate a deactivation signal in response to detecting a false crash condition or a time delay, such as 2 to 3 minutes. Then, in response to the deactivation signal, the latch device 120 may connect the first and second supplemental fasteners together and move the second supplemental fastener from an extended position to a refracted position. However, various devices and methods may be used to return the energy absorber 104 from the deployed position to the non-deployed position. The energy absorber in the non-deployed position may satisfy aerodynamic performance metrics and styling requirements for the vehicle. One non-limiting exemplary advantage of this feature is that the energy absorber 104 may be reused after it is deployed in response to a false positive signal when collision did not actually occur.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A vehicle front end structure, comprising:
   an energy absorbing structure movable between a deployed position, spaced apart from an engine support structure a first distance, and a non-deployed position, spaced apart from the engine support structure a second distance less than the first distance; and
   an actuator system including a motorized latch device slidably carried by the engine support structure and configured to move the energy absorbing structure between the positions.

2. The vehicle front end structure of claim 1, wherein the energy absorbing structure is one of a hood structure and an upper grille structure.

3. A pedestrian protection system for a vehicle comprising:
   an energy absorbing structure movable between deployed and non-deployed positions;
   a controller configured to generate a deactivation signal in response to detection of a predetermined time lapse passing after the energy absorbing structure is moved to the deployed position; and
   an actuator system configured to move the energy absorbing structure from the deployed position to the non-deployed position in response to the deactivation signal,
   wherein the energy absorbing structure in the deployed position is spaced apart from an engine support structure by a first distance that is greater than a second distance by which the energy absorbing structure in the non-deployed position is spaced apart from the engine support structure.

4. The pedestrian protection system of claim 3, wherein the energy absorbing structure is one of a hood structure and an upper grille structure.

5. The pedestrian protection system of claim 3, wherein the actuator system comprises:
a motorized latch device slidably carried by the engine support structure and movable between an extended position to move the energy absorbing structure to the deployed position and a retracted position to move the energy absorbing structure to the non-deployed position.

6. The pedestrian protection system of claim 5, further comprising a striker extending from the energy absorbing structure, wherein the latch device includes an arm that is fastened to the striker when the latch device moves between the extended position and the retracted position.

7. The pedestrian protection system of claim 3, wherein the actuator system comprises:
a first supplemental fastener attached to the energy absorbing structure;
a latch device having a second supplemental fastener; and
a motor moving the second supplemental fastener to engage the first supplemental fastener and move the energy absorbing structure from the deployed position to the non-deployed position,
wherein the energy absorbing structure is a hood, and
wherein the first supplemental fastener and the second supplemental fastener are configured to disengage from one another to permit the hood to be opened.

8. The pedestrian protection system of claim 3, further comprising:
a primary latch fastened to a striker to hold the energy absorbing structure in the non-deployed position; and
a secondary latch fastened to the striker to hold the energy absorbing structure in the deployed position,
wherein the energy absorbing structure is a hood.

9. The pedestrian protection system of claim 3, further comprising a pre-crash sensing module configured to generate an activation signal in response to detecting a potential collision.

10. A method of operating a pedestrian protection system comprising:
moving an energy absorbing structure from a non-deployed position to a deployed position in which the energy absorbing structure is spaced apart a first distance from an engine support structure;
in response to detection of a false crash condition or a predetermined time delay, generating, by a controller, a deactivation signal; and
returning the energy absorbing structure to the non-deployed position in response to the deactivation signal,
wherein the energy absorbing structure in the non-deployed position is spaced apart a second distance from the engine support structure and wherein the first distance is greater than the second distance.

11. The method of claim 10, further comprising generating an activation signal in response to detecting a potential collision with an object.

12. The method of claim 11, further comprising moving the energy absorbing structure to the deployed position in response to classifying the detected object in a class that includes a pedestrian.

13. A pedestrian protection system for a vehicle comprising:
an energy absorbing structure movable between deployed and non-deployed positions;
a pre-crash sensing module configured to generate an activation signal in response to detecting a potential collision;
a controller configured to generate a deactivation signal; and
an actuator system configured to move the energy absorbing structure from the deployed position to the non-deployed position in response to the deactivation signal,
wherein the energy absorbing structure in the deployed position is spaced apart from an engine support structure by a first distance that is greater than a second distance by which the energy absorbing structure in the non-deployed position is spaced apart from the engine support structure.

14. A pedestrian protection system for a vehicle comprising:
a hood structure movable between deployed and non-deployed positions;
a controller configured to generate a deactivation signal; and
an actuator system including
a first supplemental fastener attached to the hood structure,
a latch device including a second supplemental fastener configured to engage the first supplement fastener, and
a motor configured to move the second supplemental fastener to engage the first supplemental fastener and move the hood structure from the deployed position to the non-deployed position,
wherein the actuator system is configured to move the hood structure from the deployed position to the non-deployed position in response to the deactivation signal, and wherein the hood structure in the deployed position is spaced apart from an engine support structure by a first distance that is greater than a second distance by which the hood structure in the non-deployed position is spaced apart from the engine support structure.

15. The system of claim 14, wherein the latch device further includes an arm that is fastened to a striker extending from the hood structure when the latch device is extended.

16. The system of claim 14, further comprising:
a primary latch fastened to a striker to hold the hood structure in the non-deployed position; and
a secondary latch fastened to the striker to hold the hood structure in the deployed position.

* * * * *